United States Patent [19]

Kleinhappl

[11] Patent Number: 5,265,843
[45] Date of Patent: Nov. 30, 1993

[54] ELECTROMAGNETICALLY ACTUATED VALVE

[75] Inventor: Erich Kleinhappl, Weinitzen, Austria

[73] Assignee: AVL Medical Instruments AG, Schaffhausen, Switzerland

[21] Appl. No.: 877,094

[22] Filed: May 27, 1992

Related U.S. Application Data

[63] Continuation-in-part of Ser. No. 655,170, Feb. 14, 1991, Pat. No. 5,127,625.

[30] Foreign Application Priority Data

Feb. 19, 1990 [AT] Austria ................................. 382/90

[51] Int. Cl.⁵ ........................... F16K 31/06; F16K 7/16
[52] U.S. Cl. .................................. 251/129.17; 251/65; 251/331
[58] Field of Search ........................ 251/65, 331, 129.15, 251/129.17

[56] References Cited

U.S. PATENT DOCUMENTS 3,098,635  7/1963  Delaporte et al. .......... 251/129.17 X
3,821,967  7/1974  Sturman et al. .................. 251/65 X

FOREIGN PATENT DOCUMENTS

0230150  7/1987  European Pat. Off. .

Primary Examiner—Arnold Rosenthal
Attorney, Agent, or Firm—Watson, Cole, Grindle & Watson

[57] ABSTRACT

Electromagnetically actuated valve, comprising an actuating device, a movable plunger and a valve chamber with an opening for the medium passing through it, which opening may be closed by the plunger. In order to ensure safe functioning of the valve at small closing forces, the valve chamber is totally sealed against the actuating device and the movable plunger by means of a flexible diaphragm, the diaphragm being fitted into the housing along its circumference and being pressed against the edge of the opening by the movable plunger.

13 Claims, 6 Drawing Sheets

ELECTROMAGNETICALLY ACTUATED VALVE

This application is a continuation-in-part of application Ser. No. 07/655,170, filed on Feb. 14, 1991, now U.S. Pat. No. 5,127,625, dated Jul. 7, 1992.

BACKGROUND OF THE INVENTION

The invention relates to an electromagnetically actuated valve comprising an actuating device, a movable plunger and a valve chamber with an opening for the medium passing through it, which opening can be closed by means of the plunger, and further comprising a flexible diaphragm completely sealing the valve chamber against the actuating device and the movable plunger, which diaphragm is fitted into the housing and may be pressed against the edge of the opening by means of the movable plunger.

In general, such valves are used with media loaded with solid matter or aggressive media, for instance with waste water.

DESCRIPTION OF THE PRIOR ART

A description of such a valve is given in U.S. Pat. No. 3,812,398, the plunger and actuating device of this valve being sealed against the dirty water with the use of a diaphragm. This diaphragm is configured as a kind of bellows surrounding the plunger partially in axial direction. Since the entire diaphragm is located in the liquid stream, the arrangement requires back-up rings in order to prevent the bellows from collapsing. For this reason this kind of diaphragm is a complex, expensive and failure-prone component. In the instance of strongly polluted media the folds of the bellows may become caked with deposits, which will further impair the functioning of the valve and increase its wear.

In EP-A 0 373 142 a tube valve is disclosed which is actuated by a bistable magnet. In this instance no problems will arise with polluted media, as the medium will remain within the closed tube. In order to ensure that the valve is closed fully even at medium pressures of up to 10 bar, the holding and closing forces required for such valves are comparatively large. This will necessitate a large, heavy and thus expensive magnet on the one hand, and a relatively high energy expenditure for the switching process on the other hand.

SUMMARY OF THE INVENTION

It is an object of the invention to avoid the above disadvantages and to propose an electromagnetically actuated valve, which is also suitable for use with polluted media and whose energy expenditure for switching is as low as possible.

In the invention this object is achieved by providing an essentially disk-shaped diaphragm which is attached to the housing along its circumference. In this instance the diaphragm has a two-fold function, i.e., that of a sealing element sealing the elements of the actuating device and the plunger against the medium, and that of an actual closing element.

Energy consumption is particularly low if the plunger has two extreme positions both of which are stable. In the case of the so-called bistable magnets energy is required only for the switching between the extreme positions. Both in the open and in the closed position of the valve the plunger is held by a permanent magnet, a spring or the like.

A low-energy and low-noise variant of the invention is obtained by keeping the movable plunger in one of its two stable positions by means of a permanent magnet, the plunger being provided both with a pole face and with a stop face preferably furnished with a damping pad, which stop face will determine one extreme position of the plunger together with a corresponding counter face in the housing, a device being provided in the area between the pole face of the plunger and a fixed pole face cooperating with the first pole face, for the purpose of bridging the air gap between these pole faces and transmitting the magnetic flux. As the magnetic forces are strongly dependent on distance, the plunger is strongly accelerated during the switching process by conventional bistable magnets, and hits the permanent magnet or a pole plate placed between permanent magnet and plunger at comparatively high velocity. This will cause vibrations and considerable noise, which is often undesirable. In order to dampen the impact the flange bearing the stop face may be made of plastics material. If this is considered insufficient, an additional damping pad may be provided.

Other known variants of bistable magnets attempt to evade this problem by adding a pad of flexible material between the plunger and the magnet or pole plate in order to absorb the impact shock. Although this arrangement will help to solve the noise problem, it will create a gap for the magnetic lines of flux, thus reducing the holding forces considerably. In the version described by the invention a damping pad will guarantee quiet operation free of noise and vibrations. Between the pole faces a gap will remain, which will depend on the required closing forces of the valve and the state of wear of the damping pad, and which may therefore vary in size. This gap is bridged, however, by the device transmitting the magnetic flux, and a great holding force is thus ensured.

In a particularly advantageous variant the permanent magnet will hold the plunger in its extreme position corresponding to the open valve, and a spring is provided which will hold the plunger in its other extreme position. In this manner a particularly simple magnet configuration is obtained.

The device transmitting the magnetic flux may be configured in various suitable ways, i.e. as an annular short-circuit plate assuming a tilted position when the plunger is in extreme position, or as a soft helical spring of ferromagnetic material, or as a short-circuit pin capable of moving parallel to the direction of travel of the plunger. For practical purposes the variant most suitable for a particular application may be selected.

Especially low switching forces are obtained by giving the diaphragm an essentially circular shape and by providing it with an annular region of reduced thickness around the central region facing the edge of the opening to be closed. The central part of the diaphragm serving as the actual closing element must have a certain—relatively large—thickness to perform its function satisfactorily. If the entire diaphragm is given this uniform thickness, the plunger must not only overcome the pressure forces of the medium as the valve closes, but it must also perform a considerable amount of deformation work on the diaphragm. By reducing the thickness of the diaphragm in the area subject to the strongest deformation during the switching process, this deformation work can be drastically reduced. The larger material thickness at the periphery of the diaphragm, i.e., where it is fastened to the housing, and near the opening to be closed, which is necessary for mechanical reasons, is maintained.

In a preferred variant of the invention the proposal is put forward that the interior of the actuating device be filled with a fluid, preferably oil. In this way no forces of pressure need to be surmounted during the switching process, which will keep the size of the actuating device especially small and ensure very low energy expenditure during operation. Besides, the movement of the plunger is cushioned by the oil filling and noise is further reduced.

BRIEF DESCRIPTION OF THE DRAWINGS

The invention will now be further described by way of example only with reference to the accompanying drawings, in which FIG. 1 gives a section of a valve and its actuating device as described by the invention, FIGS. 2, 3, 4, 5 give sections of further variants of the invention, with the valve open, FIG. 6 gives the variant of FIG. 5, with the valve closed, FIGS. 7 to 11 give different variants of the device bridging the air gap between the pole faces and transmitting the magnetic flux.

DETAILED DESCRIPTION OF THE PREFERRED EMBODIMENTS

Figure 1:
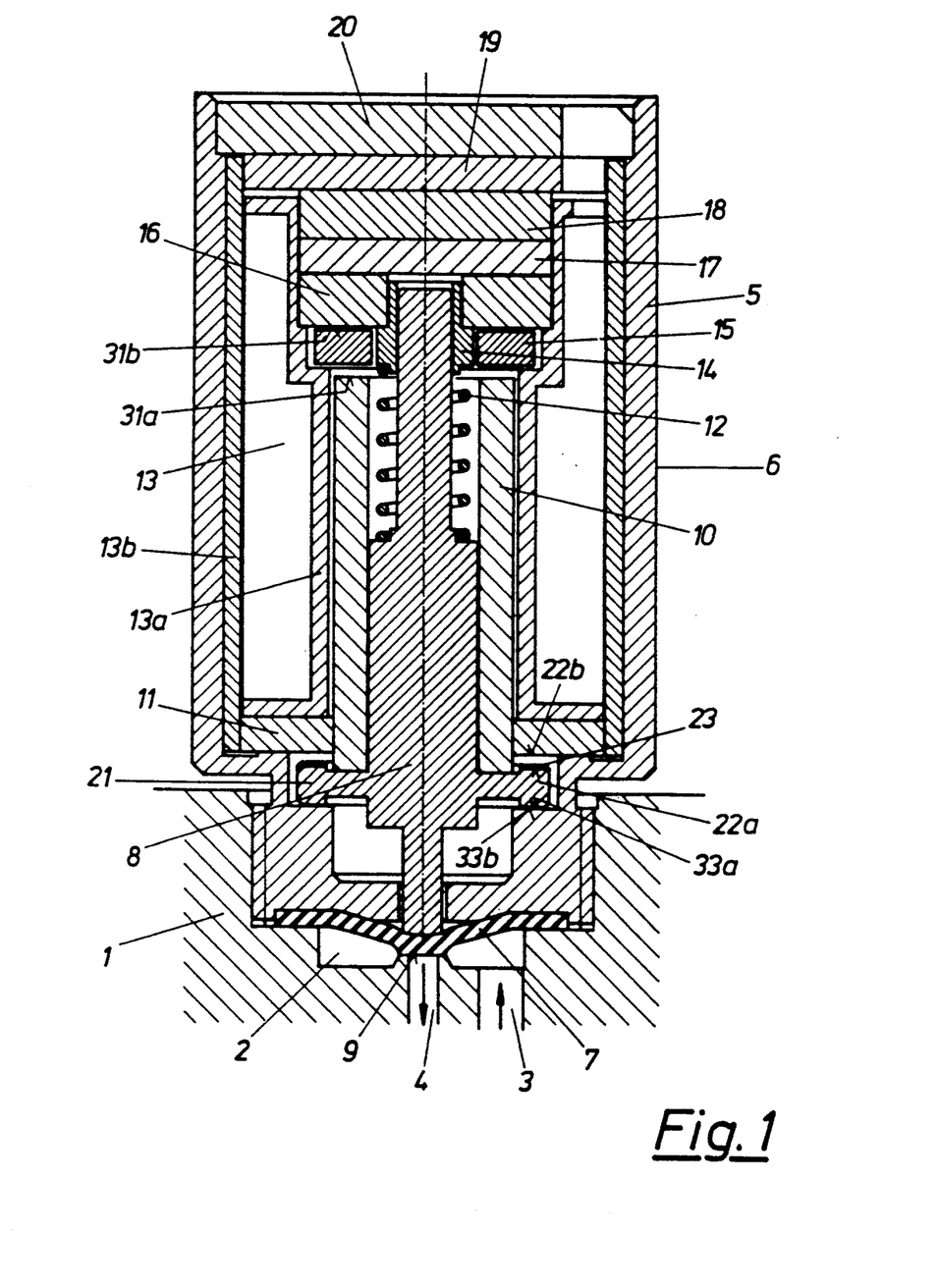

In the valve presented in FIG. 1 the valve base 1 has an essentially disk-shaped valve chamber 2, which is provided with an inlet bore 3 and an outlet bore 4. The housing 5 of the actuating device 6 is screw-mounted in the valve base 1. Between the valve base 1 and the housing 5 a flexible diaphragm 7 is held, which seals the valve chamber 2 against the actuating device 6. The actuating device 6 holds a movable plunger 8, which is capable of pressing the diaphragm 7 against the opening 9 of the outlet bore 4.

The plunger 8 is surrounded by a tubular body 10 made of ferromagnetic material. This plunger 8 may be made of plastics. A spring 12 is used to press the plunger 8 into the position corresponding to the closed valve. Switchover is effected with the use of an electromagnet 13, which is provided with a housing 13a, 13b. On the distant end of the valve the actuating device 6 contains a permanent magnet 17 attracting the body 10 of the plunger 8 against the action of the spring 12. Between the plunger 8 with its tubular body 10 and the permanent magnet 17 a pole plate 16 is located, which is made of magnetically conductive material. In order to be able to bridge a potential air gap between the pole face 31a of the tubular body 10 and the pole face 31b of the pole plate 16, a magnetically conductive short-circuit plate 15 is placed between these elements, which is held in place by a sleeve 14, which in turn is permanently attached to the pole plate 16. The magnetically conductive short-circuit plate 15 can move against the sleeve 14 to a certain extent. In this way the magnetic circuit from the permanent magnet 17 to the pole plate 18, the cover plate 19, the housing 13b, the cover plate 11, the tubular body 10, the magnetically conductive short-circuit plate 15 and the pole plate 16 is closed. Housing 5 is closed by a lid 20.

In the area of the valve base 1 the plunger 8 is provided with a flange 21, whose side facing away from the valve has a stop face 22a covered with a damping pad 23. When the valve is opened the movement of the plunger 8 is limited by the stop face 22a and its damping pad 23 touching the counter face 22b located on the cover plate 11 opposite of the stop face 22a. The cover plate 11 rests against the housing 13a of the electromagnet 13. A particularly long life of the diaphragm 7 is obtained if the geometry of the components permits a further face 33a of the flange 21 to rest against a shoulder 33b of the housing 5 in the closed position of the valve. In this way deformation of the diaphragm 7 as regards its wall thickness may be checked.

Figure 2:
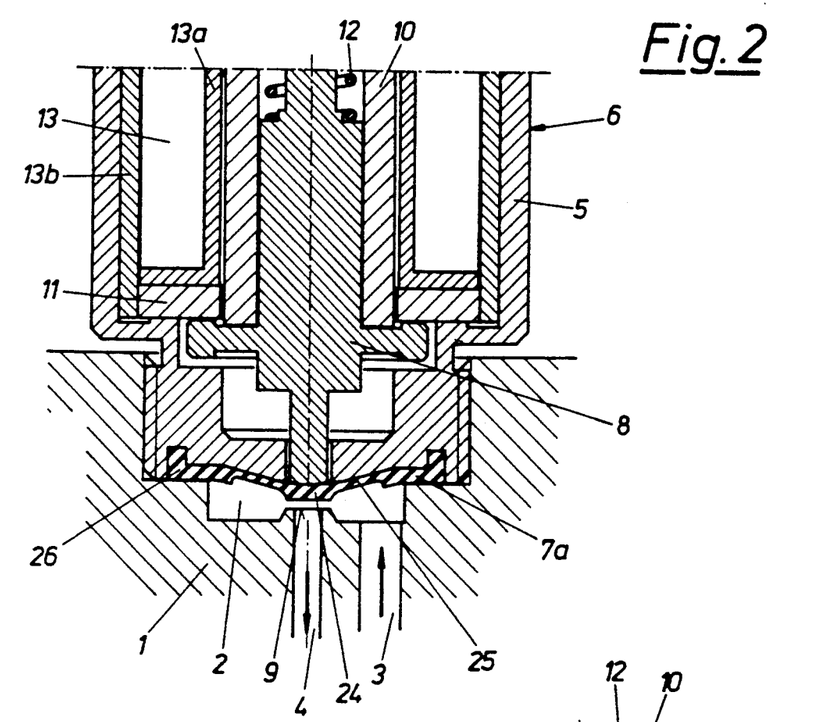

The variant shown in FIG. 2 differs from the one above only in that the diaphragm 7a has a central part 24 facing the opening 9, which is used for closing this opening. This central part 24 is surrounded by a thin-walled area 25, which is deformed when the valve is closed. The thin-walled area 25 in turn is surrounded by the fastening area 26, whose wall thickness is larger again to ensure proper sealing between the valve base 1 and the housing 5.

Figure 3:
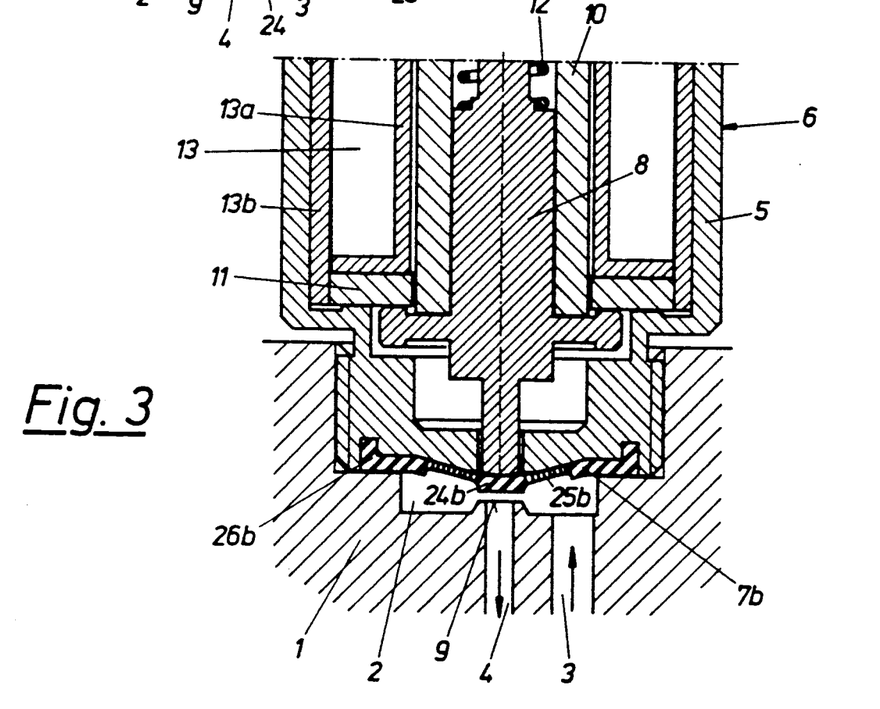
Figure 4:
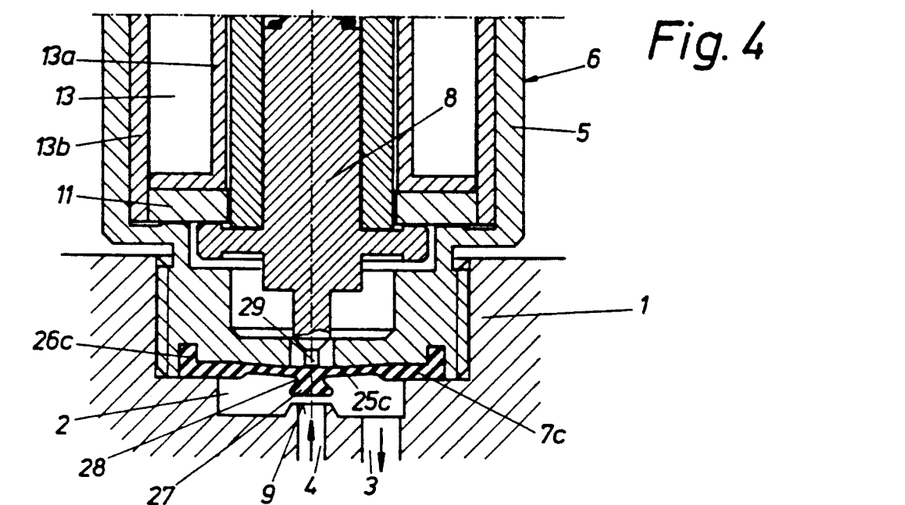

FIG. 3 presents a variant in which the diaphragm 7b has a thick-walled central part 24b made of hard material, which is surrounded by a thin-walled area 25b of a lower Shore hardness than the central part 24b. The Shore hardness of the fastening area 26b is higher again. Such a diaphragm 7b can be made by two-polymer injection molding, for example. In order to reduce the required closing forces a mushroom-shaped body 27 is used as a closing element in the center of the diaphragm 7c in FIG. 4, which element is separated from the remaining diaphragm 7c by a constriction 28. This constriction 28 serves as a pressure relief zone, since the inner pressure in the valve chamber 2 will now act on a much smaller area. The plunger 8 must be provided with a tip 29 of reduced cross-section in the area of the diaphragm 7c.

Figure 5:
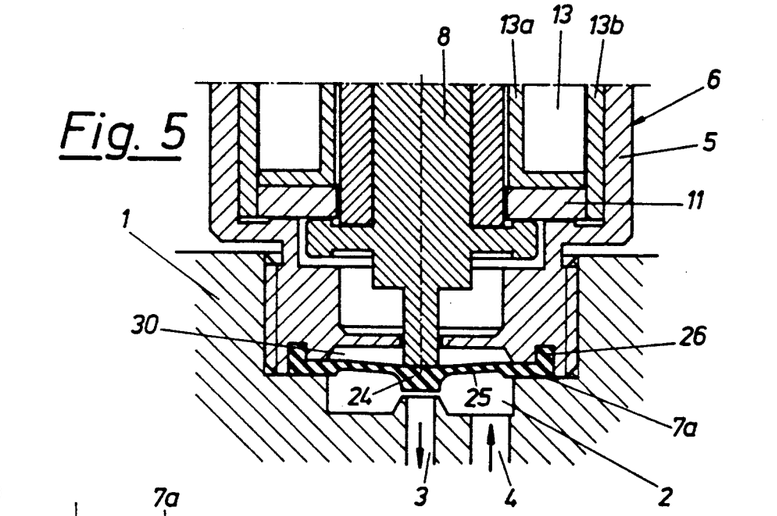
Figure 6:
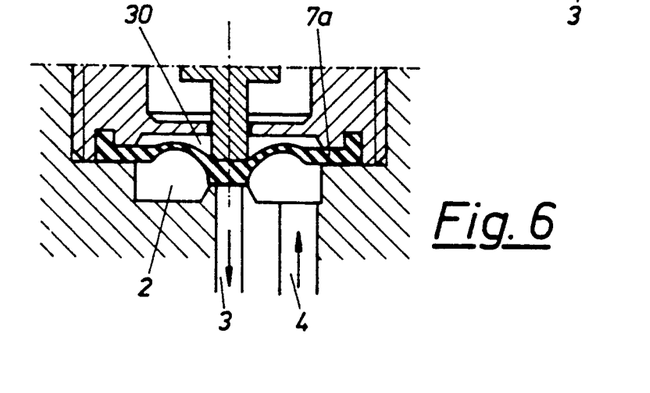

FIG. 5 shows a valve whose diaphragm 7a is totally relieved from pressure. The diaphragm 7a corresponds to that of the variant presented in FIG. 2. Unlike in FIG. 2, however, the chamber 30 behind the diaphragm is filled with an incompressible fluid in this instance, for example with oil; because of the flexibility of the diaphragm 7a the pressure in chamber 30 is always the same as that in chamber 2. In FIG. 5 the valve is shown in its open state. When the plunger 8 moves into closing position the diaphragm 7a is deformed accordingly in order to be able to maintain the pressure balance between the chamber 30 and the valve chamber 2. FIG. 6 gives a detail showing how the diaphragm 7a may be deformed.

Figure 7:
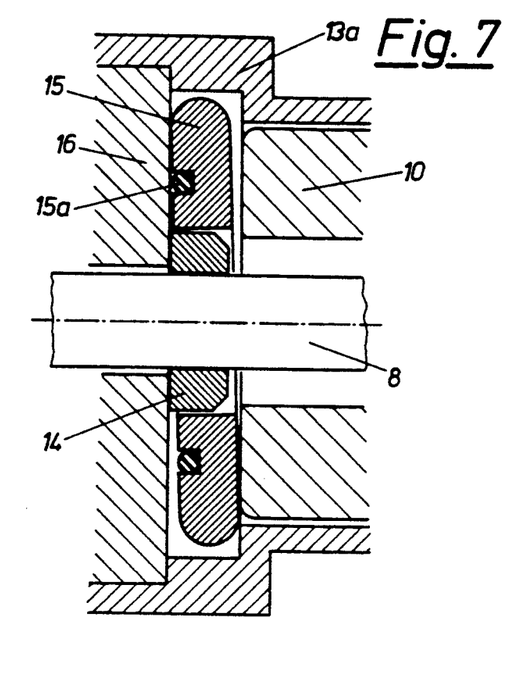

FIG. 7 gives a detailed view of a magnetically conductive short-circuit plate 15. The magnetically conductive short-circuit plate 15 is centered by a sleeve 14 and is freely movable within the given structural constraints. When the plunger 8 with its tubular body 10 approaches the pole plate 16 in the open position of the valve, the magnetically conductive short-circuit plate 15 is tilted, forming a metal connection between the tubular body 10 and the pole plate 16. This will lead to a considerable increase in magnetic flux. An O-ring 15a is held in a groove of the magnetically conductive short-circuit plate 15, which serves as a sound-absorbing element when the magnetically conductive short-circuit plate 15 hits the pole plate 16. In the variant shown in FIG. 8 the magnetic short-circuit plate 15 will deform due to the effect of the magnetic forces, assuming a slightly conical shape. To facilitate the deformation of plate 15 a number of radial slits are provided.

Figure 8:
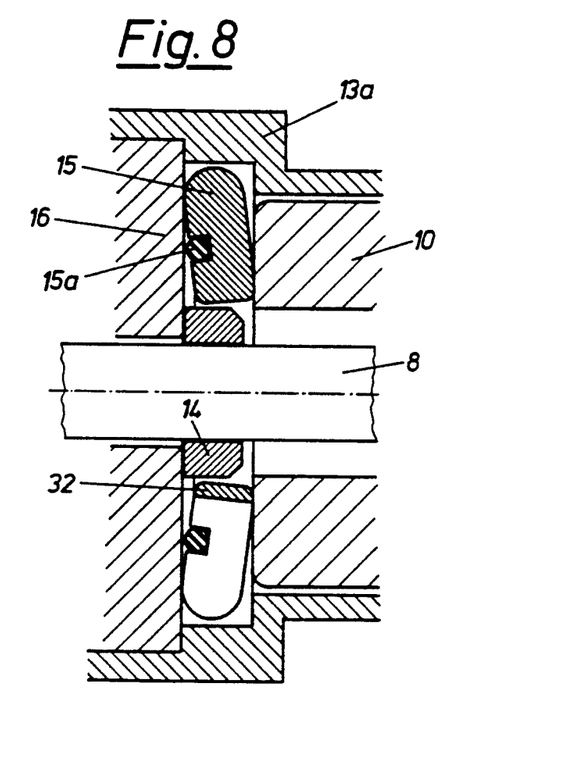

The individual segments separated by these slits are connected by bridges 32. These bridges 32 may be omitted such that the individual segments are held together only by the O-ring 15a.

Figure 9:
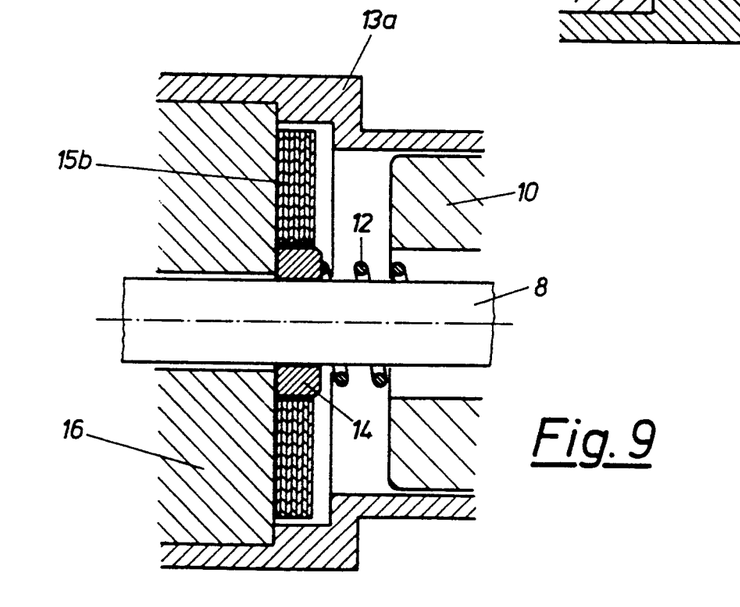

As is shown in FIG. 9, the magnetic contact may also be established via a stack of short-circuit laminations 15b, which are located between the pole plate 16 and the tubular body 10.

Figure 10:
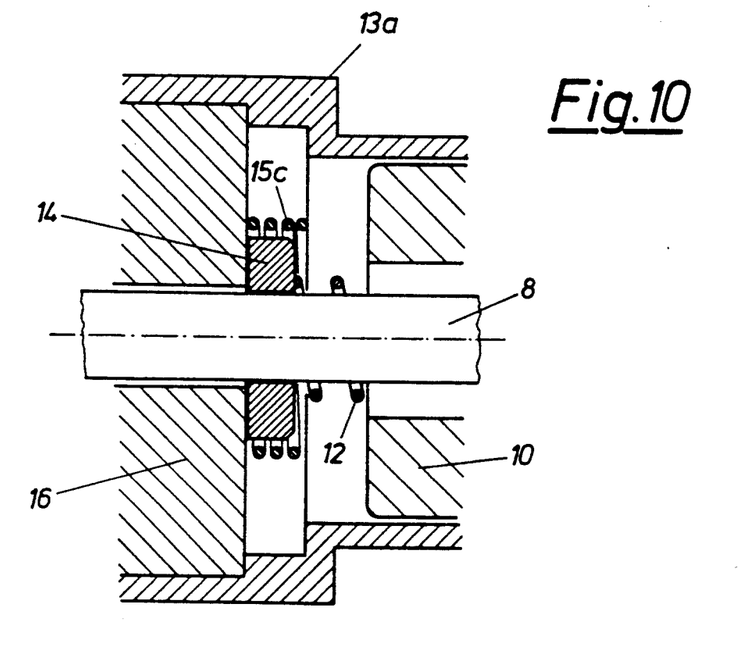

In the variant of FIG. 10 a soft helical spring 15c of ferromagnetic material is used for the transmission of magnetic flux.

Figure 11:
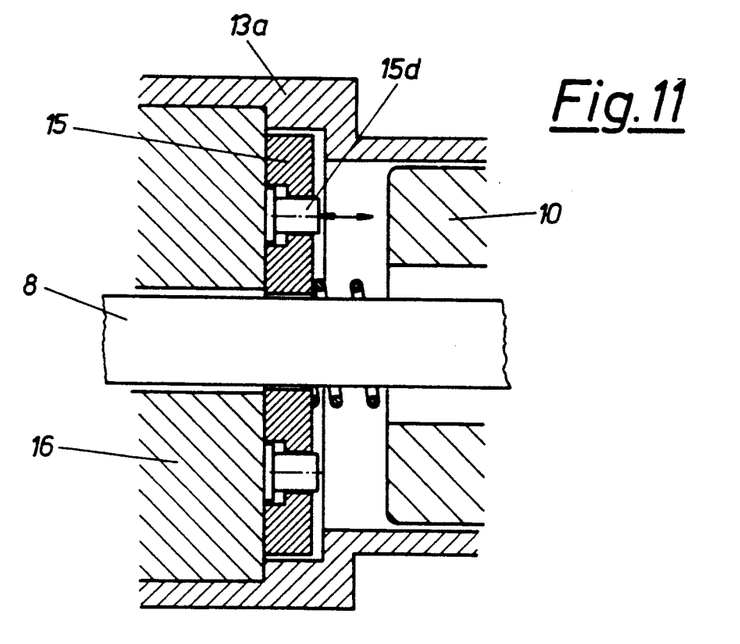

In FIG. 11 the transmission of magnetic flux is effected by short-circuit pins 15d moving axially.

Figure 12:
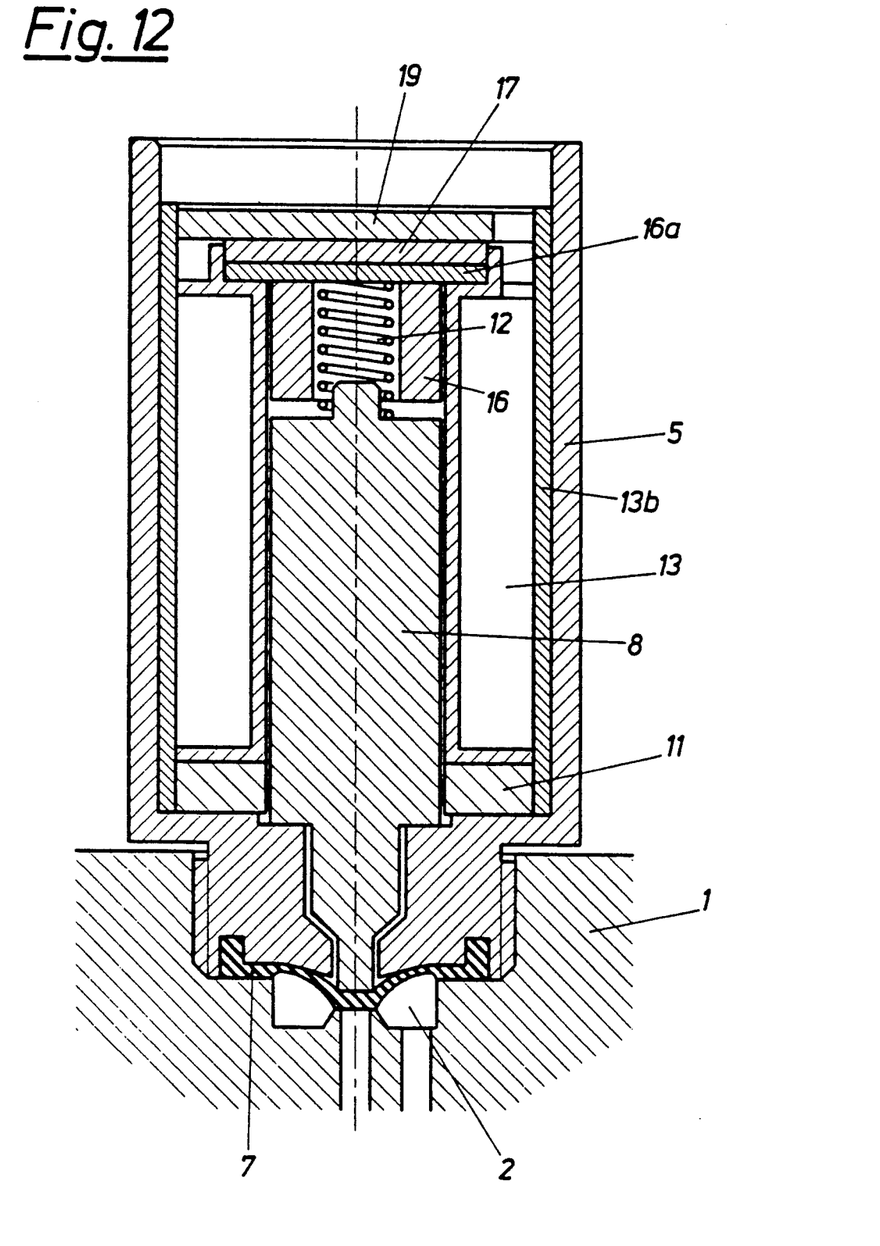
FIG. 12 shows a variation of the valve and actuating device shown in FIG. 1.

According to the embodiment shown in FIG. 12, the permanent magnet 17 has a great diameter-to-height ratio. In particular, it is shaped as a flat disk. Preferably, the permanent magnet 17 comprises a high performance rare earth magnet. Due to the magnetic properties of these materials, magnets formed in the shape of a flat disk give optimal strength. The pole plates, also referred to as guide plates, 16 and 16a, serve to conduct the magnetic force from the magnet to the plunger. It has been found that omittance of plate 16a decreases the force of the permanent magnet 17 on the plunger by about 50 percent.

In a preferred embodiment, at least one of the pole plates has an outer diameter which equals the outer diameter of the plunger. In another preferred embodiment, only one of the pole plates has an outer diameter that equals the outer diameter of the plunger. In another embodiment, one of the pole plates axially overlaps the electromagnet, preferably partially overlaps.

Preferred diameter/height ratios are from about 8:1 to about 15:1. More preferred ratios are from about 10:1 to about 12:1. The diameter/height ratio of the permanent magnet shown in FIG. 12 is approximately 11:1.

Although the present invention has been described in connection with preferred embodiments, it will be appreciated by those skilled in the art that additions, modifications, substitutions and deletions not specifically described may be made without departing from the spirit and scope of the invention defined in the appended claims.

I claim:

1. An electromagnetically actuated valve with a valve chamber, comprising
   an actuating device,
   a movable plunger,
   a valve chamber with an opening for a medium passing through it, which opening can be closed by means of said plunger, and
   a flexible disk-shaped substantially flat diaphragm completely sealing said valve chamber against the actuating device and said movable plunger, said diaphragm having an uninterrupted surface, a diameter, and a thicker part in its central area which corresponds to the opening projecting towards the valve chamber, wherein said thicker part has a thickness which is small compared to the diameter of the diaphragm, wherein said diaphragm is fitted into the housing and may be pressed against the edge of the opening by means of said movable plunger, and which diaphragm is attached to a fixed part of the valve along its circumference,
   said plunger having two extreme positions which are both stable positions.

2. An electromagnetically actuated valve with a valve chamber, comprising
   an actuating device,
   a movable plunger,
   a valve chamber with an opening for a medium passing through it, which opening can be closed by means of said plunger, and
   a flexible disk-shaped substantially flat diaphragm completely sealing said valve chamber against the actuating device and said movable plunger, said diaphragm having a thicker part in its central area corresponding to the opening projecting towards the valve chamber, which diaphragm is fitted into the housing and may be pressed against the edge of the opening by means of said movable plunger, and which diaphragm is attached to a fixed part of the valve along its circumference,
   said plunger having two extreme positions which are both stable, wherein a permanent magnet is provided to hold said movable plunger in one of its two stable positions, said plunger being provided with both a pole face and a stop face which stop face will determine one extreme position of said plunger together with a corresponding counter face in the housing, a device being provided in the area between the pole face of said plunger and a fixed pole face cooperating with the pole face of the plunger, for the purpose of bridging the air gap between the pole faces and transmitting the magnetic flux.

3. Valve according to claim 2, wherein the device transmitting the magnetic flux is configured as a soft helical spring of ferromagnetic material.

4. Valve according to claim 2, wherein the device transmitting the magnetic flux is configured as one or more short-circuit pins capable of moving parallel to the direction of travel of said plunger.

5. Valve according to claim 1, wherein the diaphragm is essentially circular in shape and has an annular area of reduced thickness around its central part facing the edge of the opening to be closed.

6. A valve according to claim 2, wherein the diaphragm is essentially circular in shape and has an annular area of reduced thickness around its central part facing the edge of the opening to be closed, said annular area consisting of softer and more flexible material than the rest of said diaphragm.

7. A valve according to claim 2, wherein a closing element for closing said opening is provided in the center of said diaphragm, which closing element is adapted to be relieved from pressure.

8. A valve according to claim 7, wherein a constriction is provided between said closing element and the rest of said diaphragm to enable said closing element to be relieved from pressure.

9. Valve according to claim 1, wherein the interior of the actuating device is filled with a fluid.

10. Valve according to claim 9, wherein the fluid is oil.

11. An electromagnetically actuated valve with a valve chamber, comprising
    an actuating device,
    a plunger, movable between two extreme positions,
    an electromagnet surrounding said plunger,
    a permanent magnet holding said plunger in one of its extreme positions,
    at least one pole plate arranged between the permanent magnet and the plunger, a valve chamber with an opening for a medium passing through it, which opening can be closed by means of said plunger, and a flexible disk-shaped substantially flat diaphragm completely sealing said valve chamber against the actuating device and said movable plunger, said diaphragm having an uninterrupted surface, a thickness and a diameter, said thickness being small compared to the diameter, wherein said diaphragm is fitted into the housing and may be pressed against the edge of the opening by means of said movable plunger, and which diaphragm is attached to a fixed part of the valve along its circumference.

12. A valve according to claim 11, wherein two pole plates are arranged between the permanent magnet and the plunger, one of which has an outer diameter equal to that of the plunger.

13. A valve according to claim 11, wherein said at least one pole plate partially axially overlaps the electromagnet.

* * * * *